United States Patent
Blackwell

(10) Patent No.: US 8,789,181 B2
(45) Date of Patent: Jul. 22, 2014

(54) FLOW DATA FOR SECURITY DATA LOSS PREVENTION

(75) Inventor: Aaron Kenneth Blackwell, Redding, CT (US)

(73) Assignee: CA, Inc., Islandia, NY (US)

( * ) Notice: Subject to any disclaimer, the term of this patent is extended or adjusted under 35 U.S.C. 154(b) by 13 days.

(21) Appl. No.: 13/444,774

(22) Filed: Apr. 11, 2012

(65) Prior Publication Data

US 2013/0276108 A1  Oct. 17, 2013

(51) Int. Cl.
*H04L 29/06* (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| | | | |
|---|---|---|---|
| 5,278,901 A | 1/1994 | Shieh et al. | |
| 5,485,616 A | 1/1996 | Burke et al. | |
| 5,592,600 A | 1/1997 | De Pauw et al. | |
| 6,240,549 B1 | 5/2001 | Hamada et al. | |
| 6,338,159 B1 | 1/2002 | Alexander, III et al. | |
| 6,857,120 B1 | 2/2005 | Arnold et al. | |
| 6,996,806 B2 | 2/2006 | Bates et al. | |
| 7,310,780 B2 | 12/2007 | Diering et al. | |
| 7,370,358 B2 | 5/2008 | Ghanea-Hercock | |
| 7,386,839 B1 * | 6/2008 | Golender et al. | 717/131 |
| 7,505,953 B2 | 3/2009 | Doshi | |
| 7,509,632 B2 | 3/2009 | Boger | |
| 7,509,677 B2 | 3/2009 | Saurabh et al. | |
| 7,594,260 B2 | 9/2009 | Porras et al. | |
| 7,681,182 B1 | 3/2010 | Mistry et al. | |
| 2003/0014498 A1 * | 1/2003 | Kreidler et al. | 709/217 |
| 2003/0084340 A1 | 5/2003 | Schertz et al. | |
| 2005/0131927 A1 | 6/2005 | Fildebrandt et al. | |
| 2005/0210454 A1 | 9/2005 | DeWitt, Jr. et al. | |
| 2006/0191008 A1 | 8/2006 | Fernando et al. | |
| 2007/0266149 A1 | 11/2007 | Cobb et al. | |
| 2008/0295173 A1 | 11/2008 | Tsvetanov | |

OTHER PUBLICATIONS

Sawyer, John, "What's Going On? Monitor Networks to Thwart Intrusions", Information Week Analytics, Strategy Session, Report ID: S1810910, Sep. 2010, 13 pages.
U.S. Appl. No. 12/885,135, filed Sep. 17, 2010.
U.S. Appl. No. 13/026,788, filed Feb. 14, 2011.

* cited by examiner

*Primary Examiner* — Michael S McNally
(74) *Attorney, Agent, or Firm* — Vierra Magen Marcus LLP

(57) ABSTRACT

There are techniques for detecting and preventing possible security violations in a computer network. The security violation detection may be based on data attached to transactions as they flow through one or more software applications. A transaction that is processed by a sequence of software components that execute on one or more electronic devices may be traced. Data that is associated with the transaction as the transaction flows through the sequence of software components may be accessed. The accessed data may be analyzed to detect a possible security violation. The accessed data may be compared to one or more pre-defined patterns. The transaction may be intercepted upon detection of a possible security violation.

24 Claims, 9 Drawing Sheets

FLOW DATA FOR SECURITY DATA LOSS PREVENTION

BACKGROUND

The present disclosure is directed to technology for security software in a computing environment.

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. Naturally, security measures are taken to protect valuable resources, such as content of databases. Unfortunately, some may attempt to take advantage of security vulnerabilities. Therefore, data loss prevention software has been developed to detect possible security breaches.

Note that is some cases, data security breaches are unintentional. For example, a user with security clearance may accidentally or unintentionally send confidential or secure data to a third party who does not have security clearance. Since such a security breach may not be expected, there may not be strong measures in place to stop such accidental or unintentional security breaches.

BRIEF SUMMARY

A circuit on an electronic device traces a transaction that is processed by a sequence of software components that execute on the electronic device. The circuit accesses data that is associated with the transaction as the transaction flows through the sequence of software components. The data associated with the transaction is analyzed to detect a possible security violation.

DETAILED DESCRIPTION

Disclosed herein are techniques for detecting and optionally preventing possible secure data loss in a computer network. The secure data loss prevention may be based on analyzing patterns of data attached to the transactions as the transactions flow through one or more software applications. For example, data attached to or otherwise associated with a transaction can be matched against a pattern such as nnn-nn-nnnn, where n represents digits, to identify possible leakage of US Social Security numbers.

In some embodiments, data that is attached to transactions ("attached data") as the transactions flow through one or more software applications is used as input to a security monitor. The security monitor may compare the attached data with pre-defined patterns to detect possible security breaches. Note that by using the attached data, security threats that occur deep within the flow through the one or more software applications may be detected.

Figure 1A:
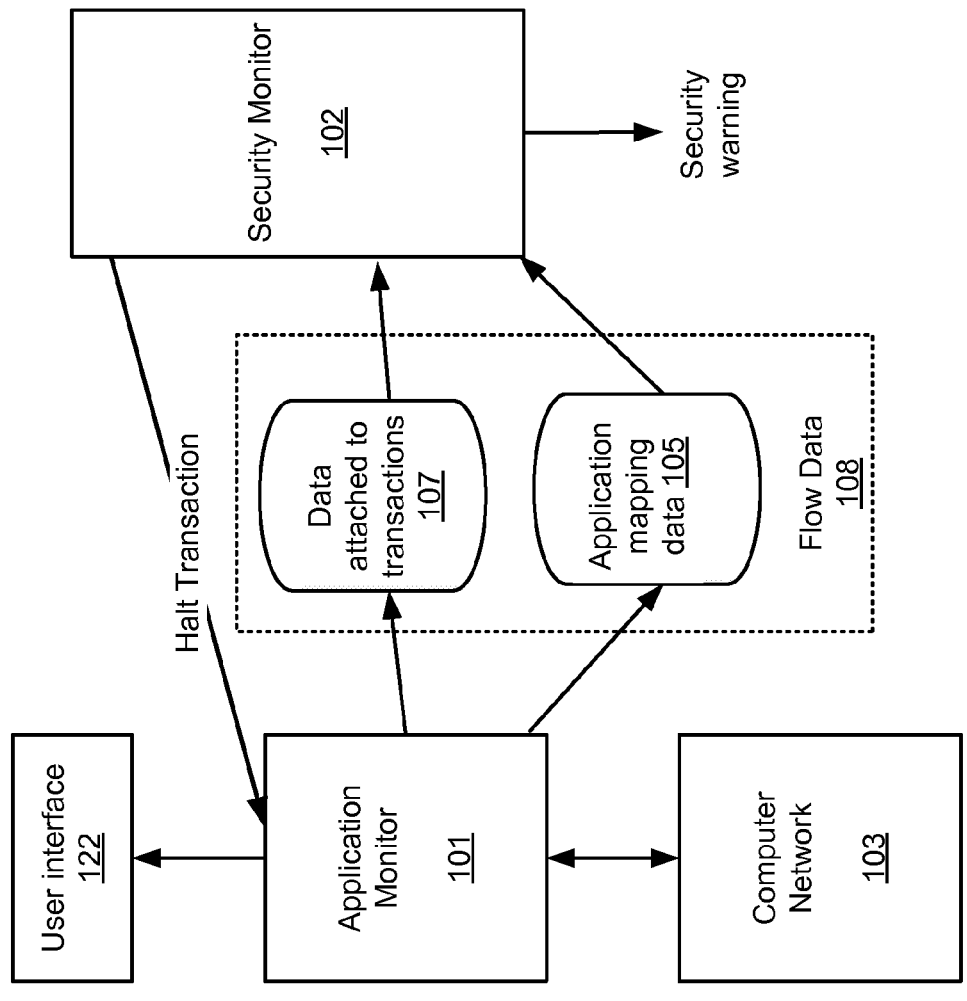
FIG. 1A is a structural overview of one embodiment of a system for detecting and preventing possible security intrusions and/or data loss in a computer network.

FIG. 1A is a structural overview of one embodiment of a system 100 for detecting and preventing possible secure data loss in a computer network. The system includes an application monitor 101 that monitors software applications running in computer network 103. The security monitor 102 detects possible security breaches of the computer network 103. Note that these may be intentional or unintentional security breaches. The security monitor 102 may issue a warning upon detecting a possible security breach. The security monitor 102 may send a message to the application monitor 101 to halt a transaction that is possibly involved in a data breach.

The computer network 103 may process transactions such as user logins, online merchandise purchases, credit card transactions, etc. In one embodiment, each of these transactions process data in various forms, such as user ID and passwords for logins, part numbers for merchandise purchases, and credit card numbers for credit card transactions.

The application monitor 101 generates flow data 108, which may include application mapping data 105 and "attached data" 107. The attached data 107 may be data that is attached a particular transaction. In one embodiment, the application monitor 101 may generate application mapping data 105 that describes how transactions flow through the computer network 103. Application mapping data 105 may describe various sequences of software components that are invoked for some purposes. For example, a given sequence of software components may be invoked to process a type of transaction. As a particular example, when a user places an order to purchase a book with an online retailer, various software components may be invoked on the retailer's web site. The application mapping data 105 may identify applications and/or software components that are invoked to process the transaction. However, note that it is not necessary for the application mapping data 105 to identify every software component that is invoked, as this may unnecessarily complicate the description of the transaction flow. As one example, the mapping data 105 may identify a software component at a front end of each application and a software component at a back end of each application. The mapping data 105 may describe dependencies between various software components (e.g., module A calls module B). Therefore, in one embodiment, the mapping data 105 includes dependency data.

One use of this application mapping data 105 is to present a graphical display on a user interface 122 to show applications and software components used in the transaction flow. Typically, a limited number of software components are shown so as to provide the user with pertinent information, without overwhelming the user with too much detail. Certain performance information, such as the average time a transaction took at a specific point in the transaction flow, may be presented to the user. The mapping of the transaction flow may be used to help the user identify problems such as bottlenecks. The application mapping data 105 may be stored in a database, or provided directly to the security monitor 102. Note that the application mapping data 105 is one type of transaction flow data.

The application monitor 101 may also provide data that is attached to the transactions 107 as the transactions flow (herein referred to a "attached data"). The attached data 107 may be used as an input to the security monitor 102. The security monitor 102 may analyze the attached data 107 to determine whether a possible security breach is or has occurred. In one embodiment, the security monitor 102 compares the attached data to one or more pre-defined patterns. The security monitor 102 may issue a security warning to an operator to investigate the possible security breach. This warning may take many forms such as an electronic communication (e.g., email, instant message, etc.), report, etc. In one embodiment, the security monitor 102 (or another component) sends a message to the application monitor 101 to halt a transaction that is suspected of causing a security breach. Thus, note that possible security breaches may not only be detected, but may also be prevented.

Figure 6A:
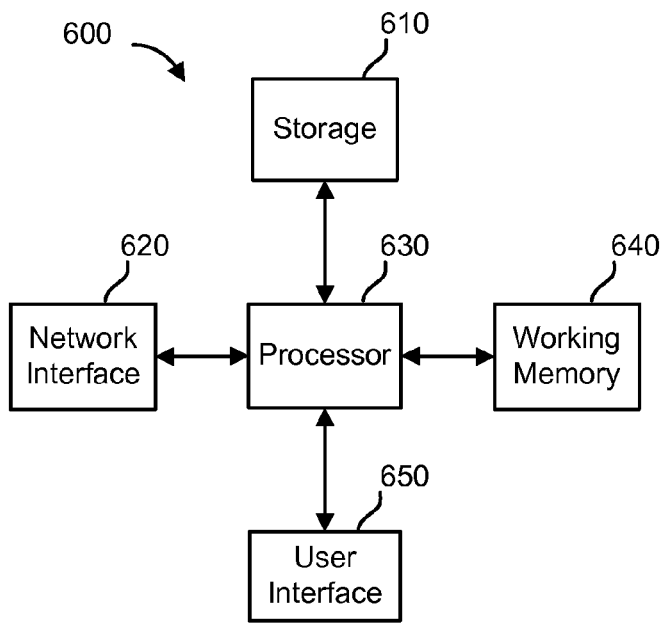
FIG. 6A depicts one embodiment of a computer system that may be used in the network of FIGS. 1A-1B.

The application monitor 101 and security monitor 102 may be implemented by a circuit on an electronic device. A circuit may include any combination of hardware and software. The application monitor 101 and security monitor 102 may be on the same or different electronic devices. In one embodiment, the electronic device has an instruction execution system, apparatus, or device. In one embodiment, the electronic device has a computer readable storage medium that stores a program for use by or in connection with an instruction execution system, apparatus, or device. In one embodiment, the electronic device is a computer system. FIG. 6A depicts one embodiment of a computer system that may be used for an electronic device.

Figure 1B:
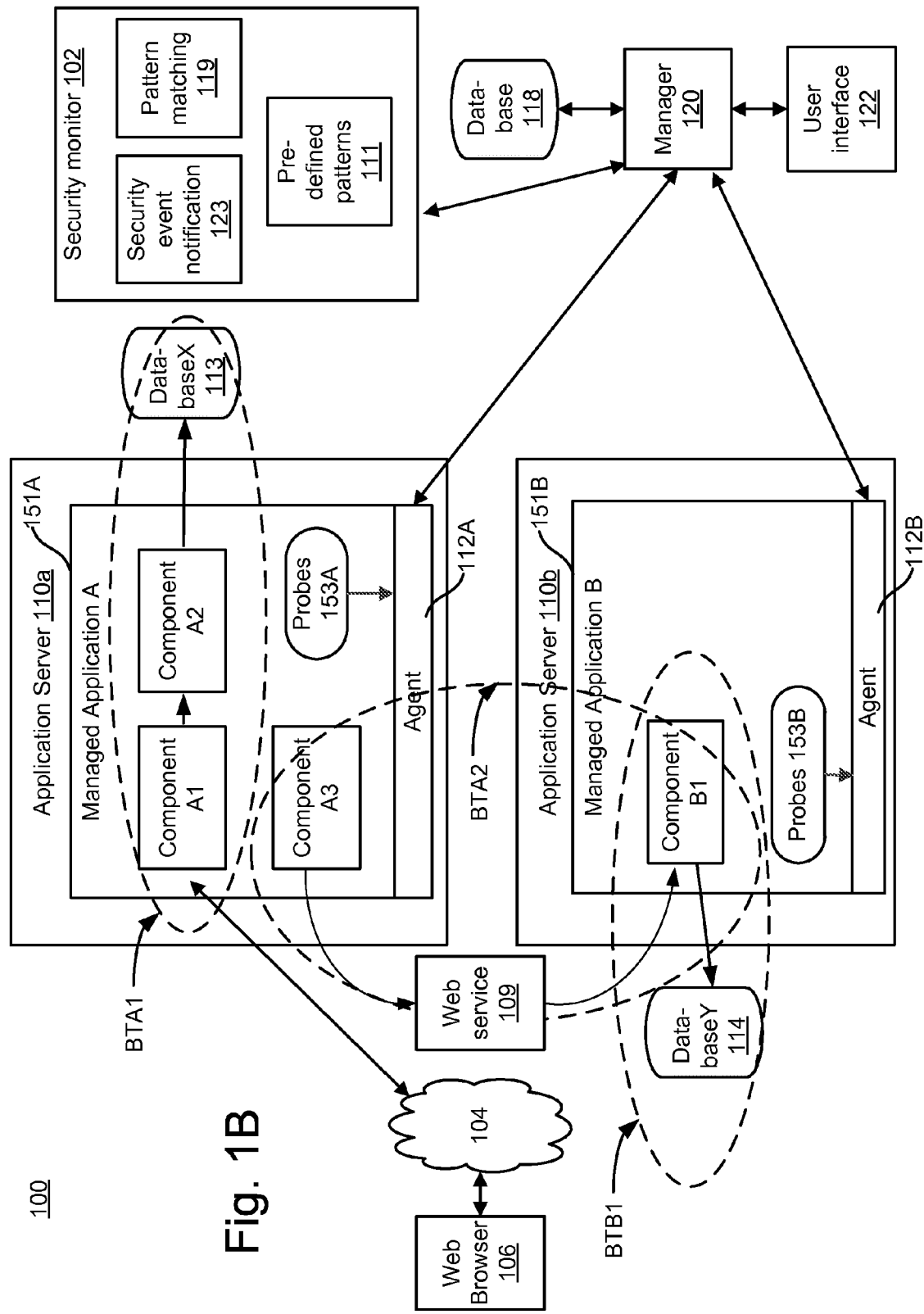
FIG. 1B provides further details of one embodiment of the system of FIG. 1A.

FIG. 1B provides further details of one embodiment of the system of FIG. 1A. FIG. 1B depicts a system 100 in which different computer systems provide data to a manager 120. The computer network 103 includes application servers 110a, 110b, web service 109, and databases 113, 114. The application monitor (FIG. 1A, 101) may include the manager 120, database 118, as well as agents 112 and probes 153 in the applications 151. The agents 112 may send the attached data 107 to the manager 120. The manager 120 may forward the attached data 107 to the security monitor 102.

In one embodiment, the attached data 107 sent to the security monitor 102 includes data elements such as strings of characters. The attached data 107 may be data that is passed between two steps in a transaction flow. For example, the attached data may be received by or sent by a software component that is being monitored. However, the attached data 107 could also be data that is processed internally by a software component that is being monitored. Thus, note that the attached data 107 may include data that is deep within the managed applications 151.

In one embodiment, the security monitor 102 has pattern matching logic 119 which it uses to compare the received data elements (e.g., attached data 107) with predefined data patterns 111 to determine whether there may be a data loss event in the computer network. Note that the security monitor 102 could use other techniques to analyze the attached data 107 to determine whether there is a possible security violation. The security monitor 102 has security event notification logic 123 for transmitting an alert upon detecting a possible security threat or can intercept the transaction in flight to prevent the potential loss of data. The security event notification logic 123 may be used to send a message to an application monitor to halt a transaction. In one embodiment, the transaction is intercepted by sending a message to one of the agents 112 instructing it to intercept the transaction.

The application servers 110 can run different applications, or separate instances of the same application. The application servers 110 can be located remotely from one another or co-located. The application servers 110 communicate with a manager computer 120, in this example. The Manager 120 could be local or remote from the application servers 110.

For example, a corporation running an enterprise application such as a web-based e-commerce application may employ a number of application servers at one location for load balancing. Requests from users, such as from an example web browser 106 of a user, are received via the network 104 such as the Internet, and can be routed to any of the application servers 110. The web browser 106 typically accesses the network cloud 104 via an Internet Service Provider, not shown.

Application servers 110a, 110b include managed application A 151A and managed application B 151B, which includes agents 112A, 112B and example probes 153A, 153B. There may be any number of probes. The distinction between elements having a letter in the reference numeral (e.g., application servers 110a, 110b) is made for purposes of discussion. Herein, the use of reference numerals without an "a," or "b," indicates that no particular server or other element is being referred to. Application 151 can be a Java® application or a different type of application. Thus, agent software running on the application servers 110, denoted by Agent 112, gather information from a managed application 151, middleware or other software, running on the application servers 110, in one possible approach. For example, information from the application 151 can also be obtained using probes 153. In practice, many such probes can be used to obtain information regarding different components of the application 151. In some embodiments, the probes may be added to the application 151 using instrumentation, one example of which is byte code instrumentation. However, the gathered data may be obtained in other ways as well. The agents 112 essentially live in the computer system being monitored and provide a data acquisition point. The agents 112 organize and optimize the data communicated to the manager 120.

For purposes describing transaction flows, software components that process transactions are depicted in the managed applications 151. The software components could include any piece of code within a managed application 151 or any piece of code outside of a managed application. For example, the software components within the managed application 151 could include, but are not limited to, Servlets, plain old Java objects (POJOs), Enterprise JavaBeans® (EJB®), sockets, etc. Software components outside the managed application 151 may include those with which the managed application 151 interacts; however, direct interaction is not required. Software components outside the managed application 151 could include, but are not limited to, databases, web services, web browsers, etc.

The flows of three separate transactions are depicted in FIG. 1B. By the flow of a transaction it is meant a sequence of some of the software components that are invoked to process the transaction. Transaction BTA1 may be initiated in response to an HTTP request from the web browser 106, as one example. For transaction BTA1, the flow is from component A1 to component A2 to DatabaseX 113. Note that the flow may be depicted as moving in one direction, although often the flow may in fact return. For example, after the database call, the flow could return to component A2 and then to component A1 to provide a response to the web browser 106. However, the return flow is not necessarily needed to adequately describe the transaction flow. Also note that there may actually be many more software components involved with transaction BTA1. However, not all of the software components may be of interest to a user. For example, there might be one or more software components along the transaction between component A1 and component A2. Also, there might be one or more components along the transaction between component A2 and DatabaseX 113. For example, there might be a socket between component A2 and DatabaseX 113. However, the socket might not be of interest to the user. For transaction BTA2, the flow is from component A3 to Web Service 109 to component B1. The flow from component B1 to DatabaseY 114 could also be considered to be part of transaction BTA2 if, for example, it was caused by the call from component A3 to component B1. The transaction BTA2 generates a transaction BTB1 with respect to ApplicationB. Specifically, the flow for transaction BTB1 is from component B1 to DatabaseY 114.

For the sake of discussion, transaction BTA1 might be a "Buy Transaction," that allows a user (at web browser 106) to buy a book or some other item. For the sake of discussion, transaction BTA2 might be a "Check Credit Transaction," that authorizes the use of a credit card for purchasing the book. Note that over time there may be many different instances of transaction BTA, as different users visit the website. Thus, transaction BTA1 may be referred to as a "type of transaction," for which there may be many instances.

In some embodiments, the agents 112 collect data that describes dependencies between the software components as transactions are processed and supply that data to the manager 120. The manager 120 may aggregate that data to form a directed graph ("digraph") that represents dependencies between the software components as the software components process the transactions. For example, the digraph may have vertices that represent the components and edges that represent the dependencies between the components. A dependency map may then be displayed on a display screen such as user interface 122 based on the digraph. The dependency map shows dependencies as the transactions are processed. The dependency map can have various levels of detail. For example, it might show dependencies between the software components. However, the dependency map could be more general and show dependencies between the applications 151 (perhaps not even showing the software components). In some embodiments, flow data is extracted from the digraph and provided to the security monitor 102.

In one embodiment, attached data 107 is associated with various points in the flow. For example, some of the attached data 107 may be derived from when component A1 was processing the transaction. Some may be derived from data sent by or received by one of the components. In one embodiment, the attached data 107 for a given transaction is a composite of data obtained from different points in the flow. As previously noted, the attached data 107 may be provided to the security monitor 102.

Note that analyzing attached data 107 from multiple points along the transaction flow allows for a more complete set of data to be analyzed. For example, when a user logs in to a web site their user name may be unencrypted and thus observable. However, their password may not be observable because it is encrypted. However, at a later point in the transaction flow, the password may be unencrypted. Therefore, the un-encrypted password could be analyzed by the security monitor 102. There are many other examples in which some piece of attached data 107 may be encrypted at some point, and thus may be difficult to analyze by pattern matching or some other security technique. However, by accessing this attached data 107 at a suitable location at which it is not encrypted, the security monitor 102 is able to analyze it.

In one embodiment, a pattern 111 is matched to attached data 107 collected at all points except one or more points where that pattern is expected (and considered to not be a security violation). For example, a credit card number might be expected to be passed at a certain point in the transaction, and thus not considered to be a security violation. Thus, a pattern to detect a possible credit card number might be matched at all points along the transaction except where a credit card number is expected to be validly passed. In one embodiment, a pattern 111 is matched to attached data 107 collected at one or more points at which the attached data 107 is not expected. Thus, note that it is not required that the pattern 111 be matched with attached data 107 collected at each and every point at which it is not expected.

Figure 2:
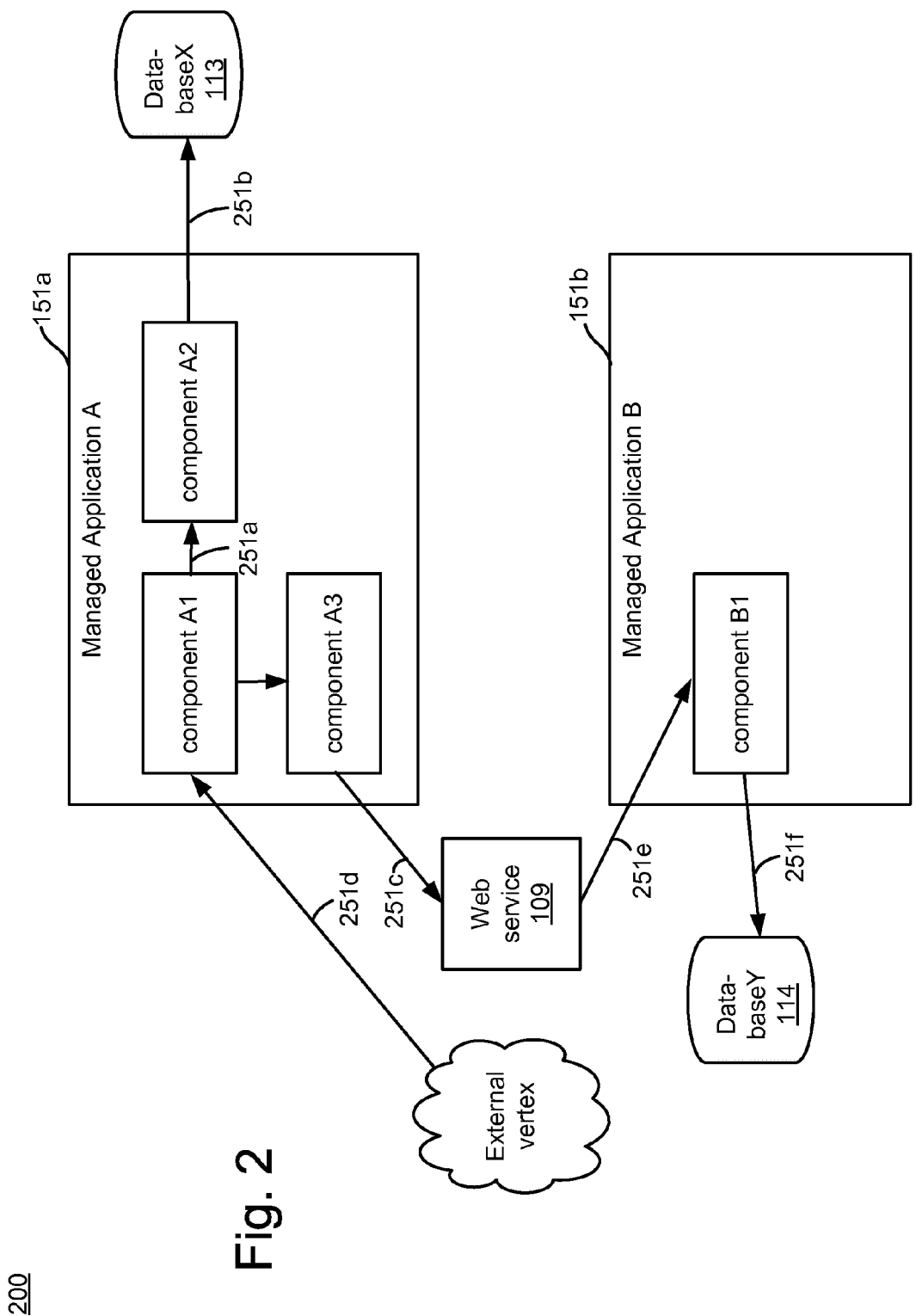
FIG. 2 depicts one example of a dependency map that could be presented on a display screen.

As noted, in one embodiment, attached data 107 is obtained while transactions are traced. In one embodiment, the tracing includes generating a dependency map. Note that generating a dependency is not required in order to trace the transactions. However, generating a dependency map will be described as one example implementation. FIG. 2 depicts one example of a dependency map 200 that could be presented on a display screen (such as user interface 122). Various performance metrics, such as the average time spent at one point in the transaction flow, might also be presented. As previously noted, this may help the user to analyze system performance.

The example dependency map 200 may show dependencies between software components of system 100 when processing transactions. In this example, the dependency map 200 pertains to some transactions processed by Applications A and B. For example, the dependency between component A1, component A2, and databaseX 113 is represented by the arrows connecting those components. Note this corresponds to transaction BTA1. The dependency between component A3, web service 109, component B1, and databaseY 114 is represented by the arrows connecting those elements. Note this corresponds to transaction BTA2. Another possibility is to show fewer details for managed application B 151b, since the user only requested details for Application A. For example, component B1 and/or database Y 114 might not be depicted. Instead there might just be an arrow from web service 109 to managed application B 151b.

The dependency map 200 may include vertices and edges. A vertex may correspond to a software component. For example, in FIG. 2, vertexes could be "external vertex," component A1, component A2, component A3, DatabaseX, web service 109, component B1, and Database Y. Also note that the term "external vertex" is being used to refer to one type of vertex that is outside of the application server. In this case, the external vertex represents some software component that sent an HTTP request to managed application A 151A. Note that the user might not be interested in exactly which software component sent the HTTP request. Therefore, using the generic term "external vertex" may provide sufficient description. However, if details of that software component are important to the security monitor 102, then that information might be collected. Note that in some cases, that external vertex is not even reported to the security monitor 102.

Several edges 251a-251f are labeled in FIG. 2. An edge represents a dependency between a pair of software components. In general, an edge may be described as an ordered pair of two software components. Edges are represented as arrows in FIG. 2. The tail and head of the arrow may be used to define the order of the software components in the ordered pair. For example, edge 251a may be described as (component A1, component A2). Edge 251b may be described as (component A2, Database X). Note that when processing a transaction, there may be other software components invoked between the ordered pair of software components. Thus, the second software component is not necessarily invoked by the first software component in the ordered pair. For example, component A2 is not necessarily invoked directly by component A1.

In one embodiment, attached data 107 is associated with vertices and/or edges. For example, data that is passed between two software components may be associated with an edge. On the other hand, data that is within a software component may be associated with a vertex.

In some embodiments, the flow data includes "component pairs." Herein, the term "component pair" means an ordered pair of two software components. Referring to FIG. 2, each of the edges 251 connects an ordered pair of two software components. Note that with this definition of component pair that a sequence of component pair can be described for a given transaction. As one example, one sequence of component pairs could be: (external vertex, component A1), (component A1, component A2), (component A2, DatabaseX). Note that a given component may appear in more than one component pair using this method of description. However, the sequence could be described in a different manner.

One example of a component pair is a "front end/back end" component pair. A front end/back end component pair includes a "front end" software component at or near a "front end" of a managed application 151 and a "back end" software component at or near a "back end" of a managed application 151. In this context, the front end software component is invoked prior to the back end software component. Note that the front end software component may not be the very first software component that is invoked in the managed application 151 when processing the transaction. For example, the very first software component that is invoked might not be of interest to the user, or might not be as useful for analysis. Likewise, the back end software component may not be the very last software component that is invoked in the managed application 151 when processing the transaction. As one example, component A1 is one example of a "front end" software component and component A2 is one example of a "back end" software component. Thus, component A1 and component A2 are one example of a front end/back end component pair (in the context of a transaction that flows through these two components). As noted, there may be software components invoked between component A1 and component A2. Also, component A1 is not necessarily the very first software component that is invoked in managed application 151 when processing a transaction.

In some embodiments, the application monitor 101 sends data attached to front end/back end component pairs to the security monitor 102, but does not necessarily send data attached to other component pairs. For example, data attached to the component pair of (component A1, component A2) may be sent. However, data attached to the component pair of (external vertex, component A1) is not necessarily sent to the security monitor 102. More generally, the application monitor 101 may send to the security monitor 102 data attached to any subset of the component pairs (including all component pairs).

In some embodiments, a software component exists outside of a managed application. Thus, a component pair could include a software component inside of a managed application 151 and a software component outside of a managed application 151. One example of this is a component pair of component A3 in managed application A and the Web service 109. A second example of this is the web service 109 and component B1 in managed application B.

Note that it is also possible to simplify the map by removing some of the components. For example, the web service 109 could be removed, in which case component A3 would be connected to component B1. This is one example of pruning. The application monitor 101 may prune in order to present a simplified view of the transaction for the user on the user interface 122. The application monitor 101 may also prune in order to provide a suitable level of detail for the security monitor 102. Note that the attached data 107 may be associated with a component that is not shown in the dependency map 200. Thus, the application monitor 101 may send attached data 107 to the security monitor 102 for components that are not depicted in the dependency map 200.

Returning again to the discussion of FIG. 1B, in one embodiment, a probe builder (not shown in FIG. 1B) instruments (e.g., modifies) bytecode for managed applications 151 to add the probes 153 and additional code. The probes 153 may measure specific pieces of information regarding the managed applications 151 without changing the applications' business logic. One type of probe measures the amount of time that a component spent executing. The amount of time could include the time spent executing by components invoked by the component having the probe, but that is not required. The probe 153 may have a begin point at an entry point of the component and an end point at each exit of the component. In one embodiment, the begin point starts a timer and the end point stops the timer. A probe 153 may collect other information besides timing information.

The probe builder may also add agent 112 which may be installed on the same machine as applications 151 or a separate machine. Once the probes 153 have been installed in the application 151, or a monitoring capability has otherwise been provided, the application is referred to as a managed application. More information about instrumenting bytecode can be found in U.S. Pat. No. 6,260,187, "System for Modifying Object Oriented Code" by Lewis K. Cirne, and U.S. Pat. No. 7,512,935, "Adding Functionality to Existing Code at Exits," each of which is incorporated herein by reference in its entirety.

As managed application 151 runs, probes 153 send data to agent 112. For example, the information from the probes may indicate performance data such as start and stop times of a transaction or other execution flow, or of individual components within a transaction/execution flow. In one embodiment, probes 153 may be implemented in objects and other code that write data, change data or otherwise cause the state of an application server to change. This data may be referred to as application runtime data.

In one embodiment, the Agent 112 may also collect attached data 107 that pertains to a transaction. The Agent 112 may associate that attached data 107 with a particular transaction. For example, each transaction that is monitored may have a transaction ID. At the time that the transaction ID is assigned to the attached data 107 it is not required that the type of transaction is known. The Agent 112 may also associate the attached data 107 with some point in the transaction flow. As one example, the Agent 112 associates the attached data 107 with a particular software component. As another example, the Agent 112 associates the attached data 107 with a pair of software components. As another example, the Agent 112 associates the attached data 107 with a vertex or edge in a dependency map.

The Agent 112 may also collect dependency data that describes dependencies between components as transactions are processed. Agent 112 then collects, summarizes and sends the application runtime data, attached data 107, and the dependency data to Manager 120. In response, Manager 120 runs requested calculations, makes application runtime data available to user interface 112 and, optionally, sends the application runtime data to database 118 for later analysis. Manager 120 may also aggregate the dependency data to form a digraph and display one or more dependency maps based on the digraph. The Manager 120 may also send flow data based on the dependency data and the attached data 107 to the security monitor 102. More information regarding monitoring an application using probes can be found in U.S. Pat. No. 7,310,777, titled "User Interface for Viewing Performance Information about Transactions," by Lewis K. Cirne, incorporated herein by reference.

Manager 120 can be provided on a separate computer system such as a workstation which communicates with a user interface 122, such as a monitor, to display information based on data received from the agents. Manager 120 can also access a database 118 to store the data received from the agents. In the example provided, the application servers can communicate with Manager 120 without accessing the network 104. For example, the communication may occur via a local area network. In other designs, Manager 120 can receive data from the Agents 112 of a number of application servers via the network 104. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. Manager 120 and user interface display 122 might be provided at a corporate headquarters location. Other applications which are not necessarily web-based or involve retail or other sales, can similarly employ agents and managers for managing their systems. For example, a bank may use an application for processing checks and credit accounts. Moreover, in addition to the multi-computer system arrangements mentioned, a single computer system can be monitored as well with one or more agents.

Figure 3:
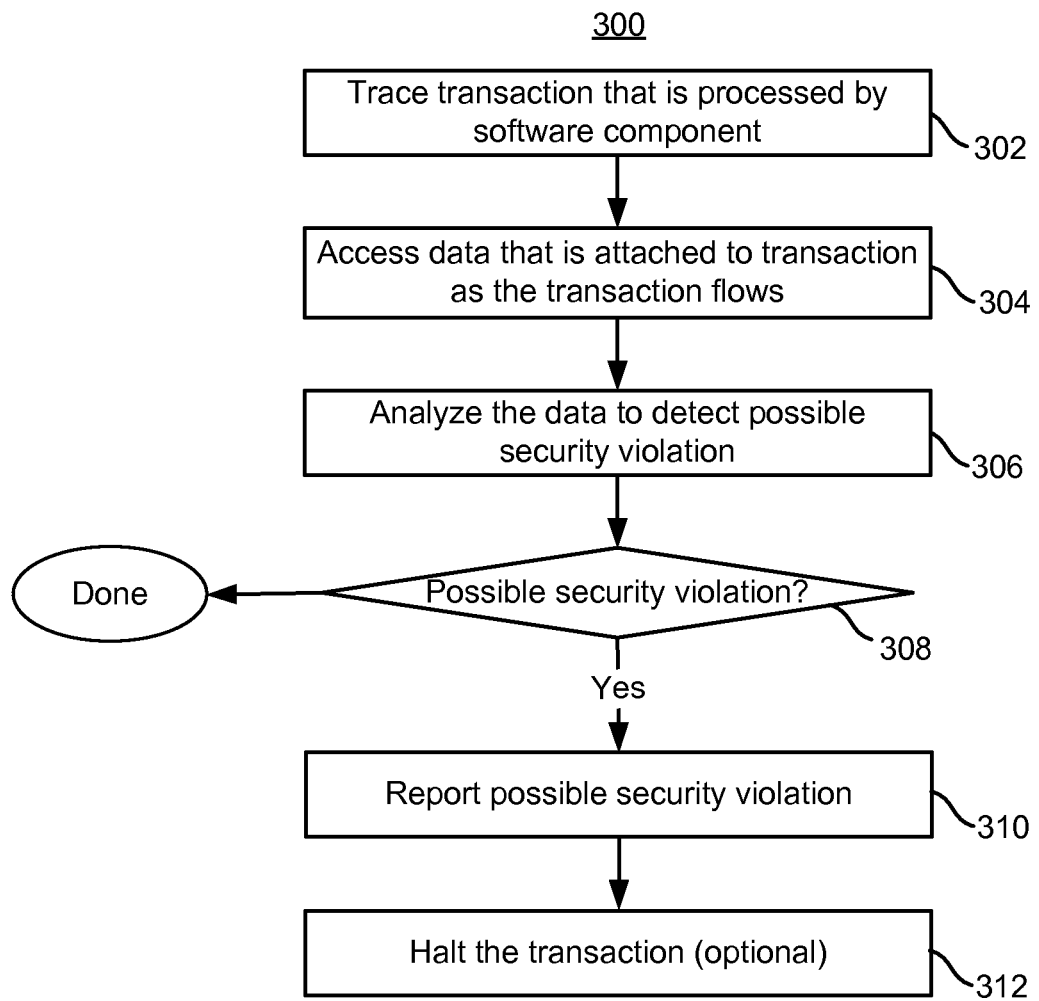
FIG. 3 is a flowchart of one embodiment of a process of using flow data to detect and optionally prevent possible security violations.

FIG. 3 is a flowchart of one embodiment of a process 300 of using flow data (which may include attached data 107) to detect and optionally prevent possible data security violations. The process 300 could be implemented in a system such as the embodiment of FIG. 1A or 1B. Note that a dependency map 200 could be formed in connection with performing process 300. However, it is not required that a dependency map be formed. Reference will be made to elements in FIGS. 1A-1B for the purpose of illustration; however, FIG. 3 is not limited to the example systems of FIG. 1A-1B. Some steps of the process of FIG. 3 may be performed by the application monitor 101 and others by the security monitor 102. Note that various steps of process 300 may be performed by an instruction execution system, apparatus, or device executing instructions that are stored on a computer readable storage medium.

Note that process 300 describes processing a single transaction. This may be one instance of a transaction such as a transaction to login, buy an item on an e-commerce web site, as some non-limiting examples. However, note that it is not required that the transaction be specifically identified. For example, process 300 is not required to identify the transaction as a login transaction or a purchase transaction.

In step 302, a transaction that is processed by one or more software components is traced. In one embodiment, the managed applications 151 are monitored by the application monitor 101. This may include determining a sequence of software components that process the transaction. For example, the flow data might identify the sequence of component A1, component A2, and databaseX. In some embodiments, the flow data contains a sequence of front end/back end component pairs. Note that the application monitor 101 may trace transactions in the managed applications 151 as a part of determining various performance metrics, such as average response times.

In step 304, data that is attached to the transaction (e.g., attached data 107) is accessed as the transaction flows through the sequence of software components. In one embodiment, the probes 153 access the attached data 107. However, note that using the probes to access attached data 107 is not a requirement. As one possibility, data that is sent from or received by one of the components involved in the transaction is accessed. In one embodiment, the attached data 107 is associated with an edge in the dependency map 200. Note that the component does not need to be one that is eventually shown in a dependency map 200. Note that it is not required that the attached data 107 be sent or received by a software component. In one embodiment, the attached data 107 is associated with a vertex in the dependency map 200. For example, the attached data 107 may be accessed by a probe 153 that monitors a component that decrypts a user password. As one example, data from an HTML response stream is captured. As other examples, EJB parameters or Web Services parameters are captured.

In step 306, the security monitor 102 analyzes the attached data 107 to determine whether a possible security intrusion is occurring or has occurred. In one embodiment, the security monitor 102 compares the attached data 107 to one or more pre-defined patterns to determine whether a possible security intrusion is occurring or has occurred.

If a possible security violation is/has occurred, then this is reported in step 310. In one embodiment, the security monitor 102 sends a message to the Manager 120. The Manager 120 may take a variety of actions depending on a policy in place. The Manager 120 may send a notification to an operator. For example, the Manager 120 may send an email, alert etc. that warns of the possible security threat.

Note that some security violations may be unintentional. For example, a user with clearance to see secure data may not realize that they are about to release the secure data to a third party that does not have security clearance. In one embodiment, a message is presented to a user in step 310 asking them if they wish to proceed with the transaction. Further details of preventing an unintentional security breach are discussed with respect to FIG. 5B.

In optional step 312, the transaction that is involved in the possible security breach is halted. Further details of halting the transaction are discussed with respect to FIG. 5A.

Figure 4:
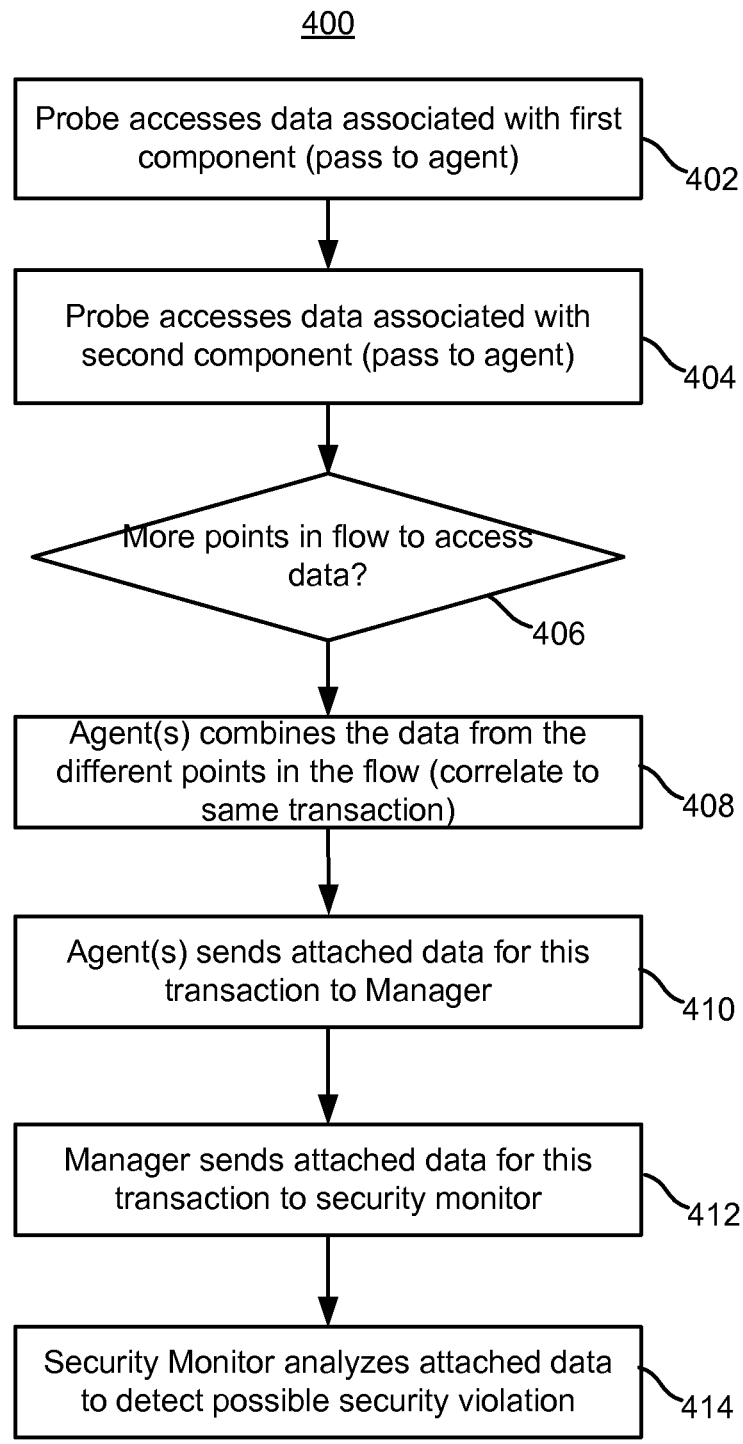
FIG. 4 is a flowchart of a process of one embodiment of detecting a potential security breach based on data attached to a transaction at various points in the transaction flow.

FIG. 4 is a flowchart of a process 400 of one embodiment of detecting a potential security breach based on attached data 107 that is collected at multiple points in the transaction flow.

In step 402, a probe 153 accesses attached data 107 from a first point in the transaction flow. For example, the probe 153 accesses attached data 107 that is associated with one of the software component. The attached data 107 might be sent from or received by the software component. The attached data 107 may be sent/received in accordance with some communication protocol or otherwise. As one example, the attached data 107 may be part of an HTTP message. As another example, the attached data 107 may be parameters in a call to another software component. The attached data 107 could be data that is internally processed by the software component. The probe 153 may also pass the attached data 107 to an Agent 112.

In step 404, a probe 153 accesses attached data 107 from a second point in the transaction flow. This may be a second probe accessing attached data 107 that is associated with a different software component. The probe 153 may pass this attached data 107 to an Agent 112.

Step 406 indicates that attached data 107 may then be accessed from additional points in the transaction flow. These additional points could be in the same or a different managed application 151. These additional points could be in the same or a different computing device. For example, the transaction may flow over multiple servers.

In step 408, the Agent(s) 112 combines the attached data 107 from the various points in the transaction flow. Note that the Agent 112 may add a transaction ID with the attached data 107. Note that step 408 may involve one or more Agents 112. As one example, the user's ID from one point and the user's unencrypted password from another point are both associated with the same transaction. Later, instead of simply matching the user's ID with one pattern 111, and simply matching the user's unencrypted password with another pattern 111, the combination of the user's ID and the user's unencrypted password may be matched with a pattern 111 to determine a possible security violation. Therefore, a security violation that might be missed by examining data from a single point in the transaction flow can be detected.

In step 410, the Agent 112 sends the attached data 107 to the Manager 120. Optionally, other Agents 112 send the Manager attached data 107 for this transaction.

In step 412, the Manager 120 sends the attached data 107 for a particular transaction to the security monitor 102. In step 414, the security monitor 102 analyzes the attached data 107 to detect a possible security violation. In one embodiment, the security monitor 102 compares the attached data 107 to one or more pre-defined patterns to detect a possible security violation. In one embodiment, the security monitor 102 compares data 107 that was collected from more than one point in the transaction ("combined data") to a single pre-defined pattern to detect a possible security violation. In one embodiment, the security monitor 102 compares data 107 that was collected from one or more points in the transaction that the data is not expected to one or more pre-defined patterns to detect a possible security violation. For example, the pattern nnn-nn-nnnn is matched with data collected at one or more points that a social security number is not expected. Similar pattern matching may be performed to look for a possible credit card number.

Figure 5A:
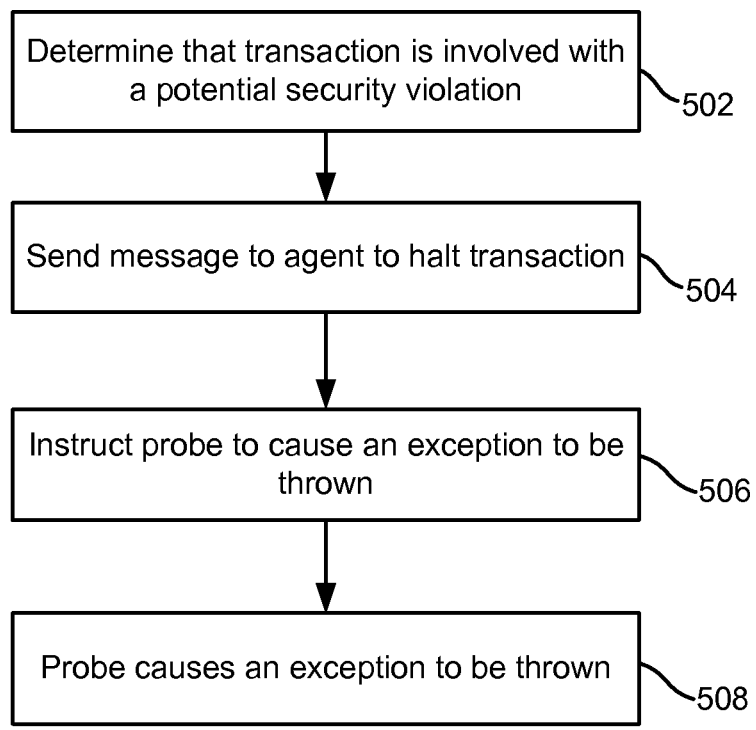
FIG. 5A is a flowchart of a process of one embodiment of halting a transaction for which a possible security breach has been detected.

FIG. 5A is a flowchart of one embodiment of a process 500 for halting a transaction that is a possible security violation. In step 502, the security monitor 102 determines that a possible security violation is associated with a particular transaction. Note that step 502 may occur while the transaction is still being processed.

In step 504, a message is sent to one or more of the Agents 112 to halt this particular transaction. This message may be sent from the Manger 120, security monitor 102, or elsewhere.

In step 506, the Agent 112 instructs one or more of the probes 153 to halt this particular transaction. In step 508, one or more of the probes 153 causes an exception to be thrown. The managed application 151 may then handle the exception in accordance with its own procedures, whereby the transaction is halted. Having a probe 153 cause an exception is one example of halting a transaction; however, other techniques may be used.

Figure 5B:
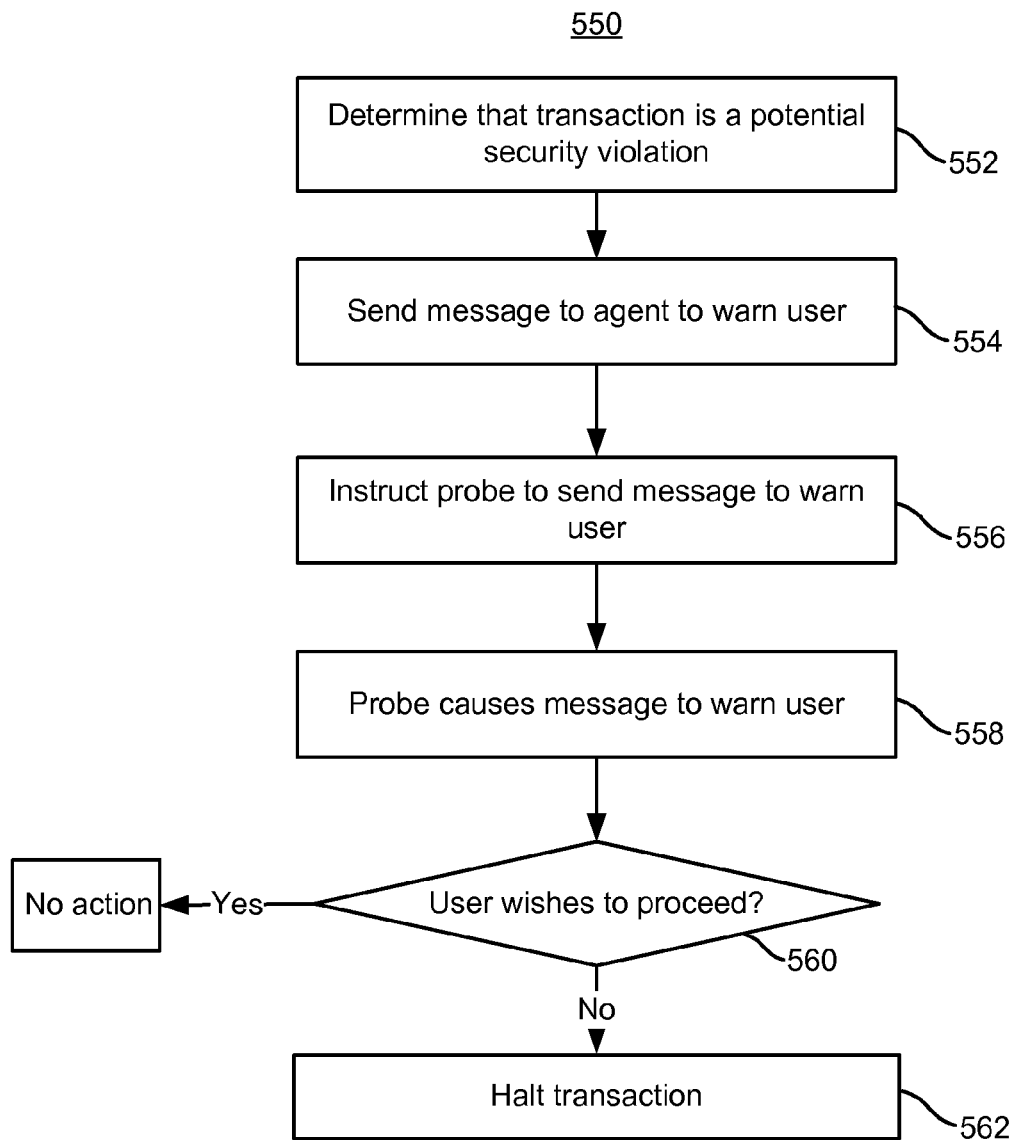
FIG. 5B is a flowchart of one embodiment of a process for preventing unintentional data security breaches.

In some cases, a user may unintentionally create a potential data security violation. For example, a user with clearance to access sensitive or confidential data may unintentionally attempt to release the data to a third party who does not have clearance. FIG. 5B is a flowchart of one embodiment of a process 550 for verifying with a user that they do intend to take some action with secure data that might cause a security violation. In process 550, the Agents 112 and probes 153 are used to warn the user. However, an alternative is to use software other than the Agents 112 and/or probes 153. In step 552, the security monitor 102 determines that a possible security violation has occurred in connection with a transaction.

In step 554, a message is sent to one or more of the Agents 112 to warn the user that their action may cause a security violation. In step 556, the agent 112 instructs a probe 153 to warn the user that they may cause a security violation if they proceed. In step 558, the probe 153 causes a message to be displayed that warns the user. As one example, the probe 153 causes the managed application 151 to display the warning message. The message may seek confirmation from the user that they wish to proceed with their action.

If the user does not wish to proceed (step 560), then the transaction is halted in step 562. One example for halting a transaction has been discussed with respect to FIG. 5A. If the user does wish to proceed, then no action is taken such that the transaction may proceed.

Note that although various embodiments were discussed in which Agents 112 and probes 153 are used to detect and/or prevent security breaches, it is not required that Agents 112 and/or probes 153 be used to detect and/or prevent security breaches.

FIG. 6A depicts one embodiment of a computer system that may be used in the network of FIGS. 1A-1B. The computer system 600 is a simplified representation of a system which might be used as the security monitor 102, web service 109, web browser 106, host (such as application servers 110), Manager 120 and/or user interface 122, such as discussed in connection with FIGS. 1A-1B. The computer system 600 includes a storage device 610, also referred to as a computer readable storage medium, such as a hard disk or portable media, a network interface 620 for communicating with other computer systems, a processor 630 for executing software instructions, a working memory 640 such as RAM for storing the software instructions after they are loaded from the storage device 610, for instance, and a user interface display 650. Processor 630 is one example of an instruction execution system, apparatus, or device, discussed below. The storage device 610 is one example of a computer readable storage medium having computer readable program code embodied therewith. The computer readable program code may be configured to perform methods for providing the functionality discussed herein. In one embodiment, the computer readable program code is configured to program a processor 630 to perform methods for providing the functionality discussed herein. The user interface display 650 can provide information to a human operator based on the data received from one or more agents. The user interface display 650 can use any known display scheme, whether graphical, tabular or the like. In addition to an on-screen display, an output such as a hard copy such from a printer can be provided.

Further, the functionality described herein may be implemented entirely as hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an appropriate electrical connection having one or more wires, a portable computer diskette, a hard disk, a random access memory (RAM), a read-only memory (ROM), an erasable programmable read-only memory (EPROM or Flash memory), an appropriate optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Figure 6B:
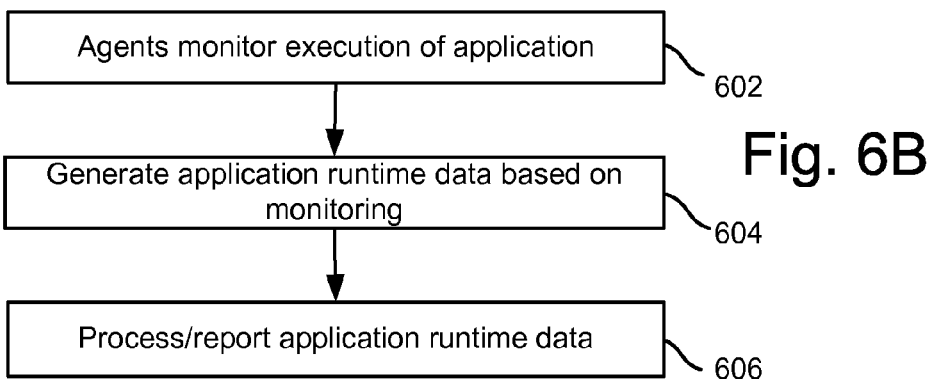
FIG. 6B illustrates a flowchart of an embodiment of a process of monitoring applications.

In some embodiments, the Agents 112 monitor the applications 151 and transfer application runtime data to Manager 120, where the data is analyzed and reported to a user. FIG. 6B illustrates a flowchart of an embodiment of a process of monitoring applications 151. The process may be performed in the example system 100 of FIGS. 1A-1B. An application 151 is monitored by Agents 112 at step 602. Monitoring may involve Agents 112 determining which transactions of application server 110 are processed and the duration for which they are invoked when the application processes a client request. Monitoring may also involve Agents 112 determining attached data 107, as well as dependency data as components process transactions. Step 602 may include probes 153 in the managed application 151 executing to collect data.

Application runtime data based on the monitoring of the application 151 is generated at step 604. The generated application runtime data can indicate the application components involved in processing a request, the duration that each component consumed in processing a request, and other information. The application runtime data can be generated by Agent 112, based on data that results from execution of the probes 153, after which the Agent 112 may forward the generated application runtime data to Manager 120. Generally, application runtime data can include information such as average component (e.g., method) execution time, a component invocation rate per second or per interval, a count of component invocations, a concurrency metric indicating number of component invocations that have started but not finished per interval, and a stalled metric indicating a number of component invocations that have started whose component invocation times have exceeded a specific threshold per interval. Further, application runtime data can identify a garbage collection heap size, a bandwidth metric indicating file and socket activity, a number of threads, system logs, exceptions, memory leaks and component interactions. Note that the application runtime data may be linked to particular transactions being processed by the managed application 151.

The application runtime data may be processed and reported by Manager 120 at step 606 such as by aggregating the data, storing the data, and providing the data to an operator through an interface or other user interface 112.

Figure 7:
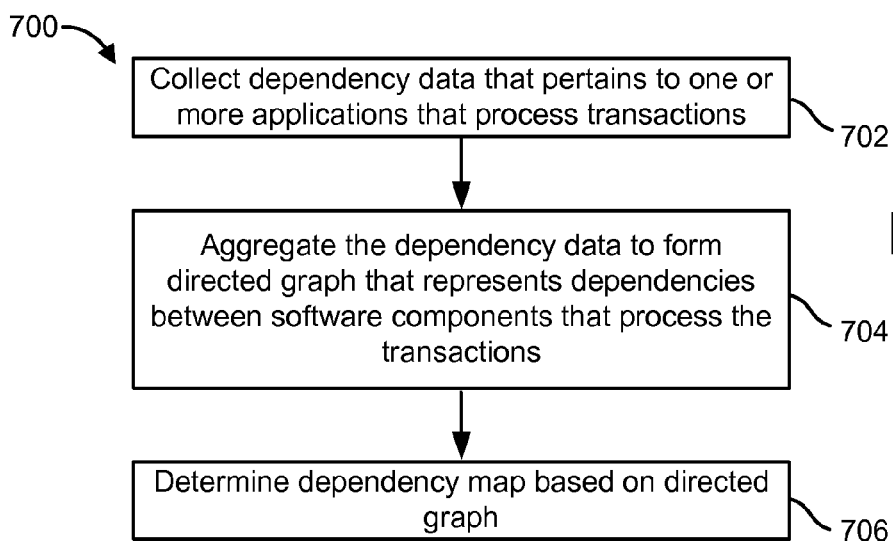
FIG. 7 is a flowchart depicting one embodiment of a process for determining a dependency map based on a digraph.

FIG. 7 is a flowchart depicting one embodiment of a process 700 for determining a dependency map 200 based on a digraph. Process 700 may be used in a system such as system 100 of FIGS. 1A-1B. Process 700 may be performed by the application monitor 101. The flow data that is sent to the security monitor 102 may be based on the digraph. However, note that there are other ways to generate flow data without forming a digraph. In step 702, dependency data is collected. The dependency data may be collected by agents 112. In one embodiment, the dependency data includes vertex data that describes software components and edge data that describes dependencies between the software components.

Note that the dependency data may include data for many different instances of a managed application 151 (e.g., Managed Application A 151A). For example, the system 100 might have a number of servers that each runs a different instance of Managed Application A 151A. In some cases, a single server might run different instances of Managed Application A 151A. Similar factors may apply to Managed Application B 151B. Also note that there may be many different instances of a particular type of transaction. As noted above, there may be many different instances of transaction BTA1, which might correspond to different users making a purchase. Thus, the dependency data may include data for many different instances of each type of transaction.

In step 704, the dependency data is aggregated to form a directed graph that represents dependencies between software components that process the transactions. In some embodiments, the directed graph includes vertices that correspond to various software components (e.g., servlets, EJB, device drivers, DBMS, sockets, etc.), as well as edges between pairs of the software components.

In optional step 706, a dependency map 200 is displayed based on the directed graph. Note that the dependency map 200 may reduce some of the complexity of the directed graph. For example, not all of the vertices in the directed graph need to be displayed in the dependency map 200. Likewise, not all of the edges in the directed graph need to be displayed in the dependency map. Note that the dependency map 200 may be displayed in response to a user request for a specified level of detail. Thus, it will be evident that although the flow data may be extracted from the directed graph, the flow data is typically not what is presented to the user in the dependency map 200.

Figure 8:
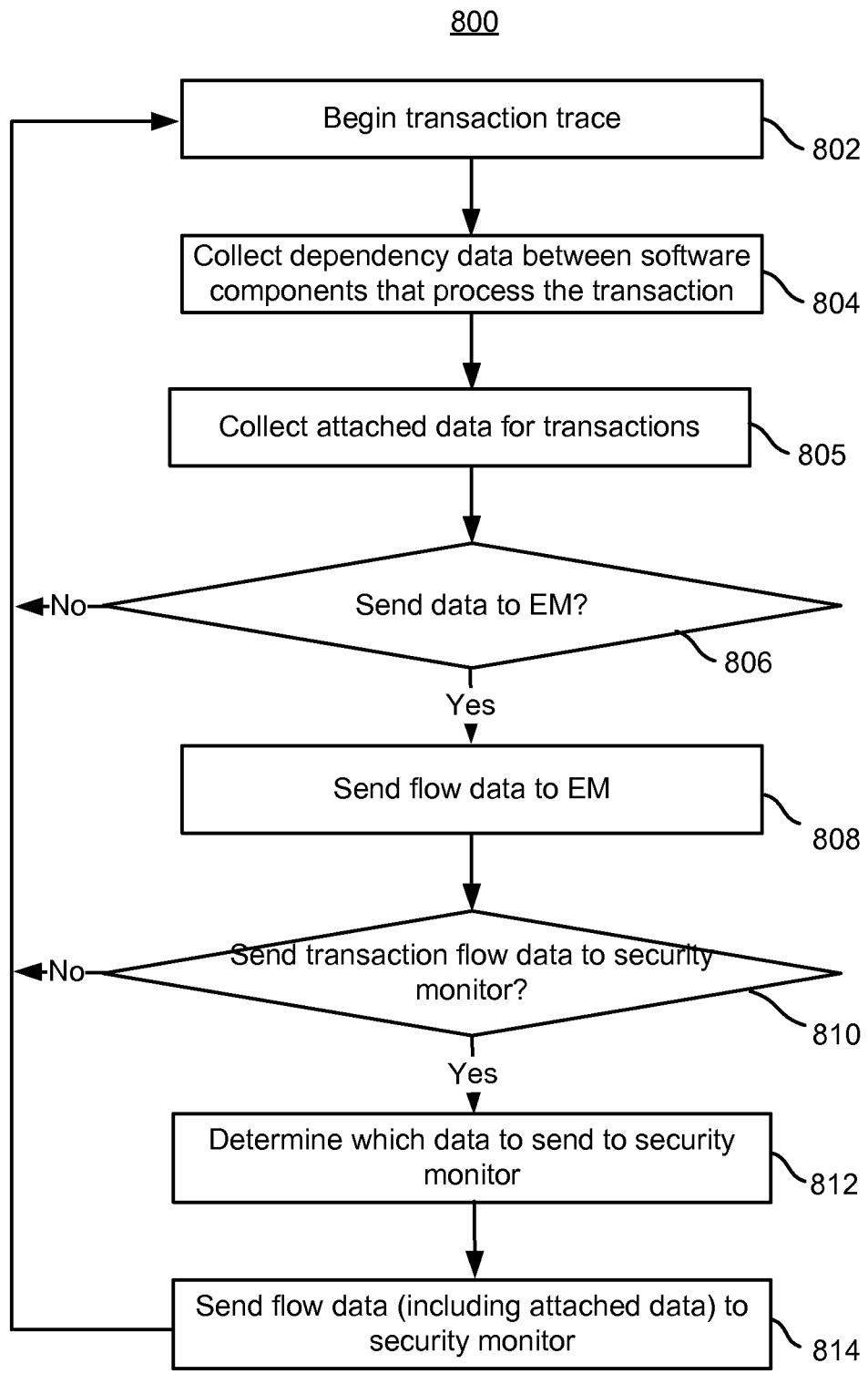
FIG. 8 is a flowchart that depicts one embodiment of a process of generating flow data to send to a security monitor.

FIG. 8 is a flowchart that depicts one embodiment of a process 800 of generating flow data 108 (which may include attached data 107 and application mapping data 105) to send to the security monitor 102. In this process 800, the flow data 108 includes dependency data. In step 802, a transaction trace is begun. In one embodiment, a transaction trace begins when certain software components are identified as the first element in the transaction calling stack. These software components may be ones that have at some point been identified as being of interest. In some embodiments, the transaction trace captures boundaries of the transaction. The lower limit of the boundary may be defined by the first interesting element in the call stack. An interesting element can be pre-defined by specifying a type of component, such as a Servlet, that is considered interesting, as one example. In one embodiment, the upper boundary may be controlled by transactional calls outside the JVM (Java Virtual Machine). The lower boundary in the stack may be termed the Frontend, while the upper boundary may be termed the Backend. Referring to FIG. 1B as one example, component A1 might be a Frontend and component A2 might be a Backend.

In step 804, one or more agents 112 collect dependency data that represents dependencies between the software components that process the transaction. For example, the dependency data may include an edge between the Frontend and the Backend. Referring to transaction BTA1 in FIG. 1B, the arrow between component A1 and component A2 could be such an edge. A starting edge may also be created between an external entity and the Frontend vertex. Referring to FIG. 1B, the network 104 (or web browser 106) could be considered to be an external vertex. One reason for referring to the network 104 as an "external vertex" is that it may be outside of a virtual machine (e.g., JVM) on application server 110a. Thus, the starting edge would be between network 104 and component A1. There may also be an edge between component A2 and DatabaseX 113. Note that more than one agent could collect the dependency data for a single transaction. For example, agents 112a and 112b might both collect data for transaction BTA2.

In step 805, one or more agents 112 collect attached data 107 for transactions being monitored. Steps 402-408 of FIG. 4 describe one example of probes 153 and agents 112 collecting attached data 107.

In step 806, the agent 112 determines whether the data from step 804 and/or 805 should be provided to the Manager 120. The data may be provided at any time and with any frequency. The data may be provided in response to a request from Manager 120 or without a request. Since some embodiments intercept (or halt) a transaction in flight to prevent data loss, the attached data 107 could be sent to the Manager 120 while the transaction is still in flight. If the data is not to be provided to the Manager 120, process 800 returns to step 802 to begin a trace of another transaction. Tracing another transaction could be tracing a different instance of transaction BTA1 or tracing a different type of transaction (e.g., BTA2)

At some point, the data is sent from the agent(s) 112 to Manager 120 (step 808). As noted, the dependency data may describe edges and vertices. In one embodiment, the attached data 107 is associated with one or more edges and/or one or more vertices. In step 810, Manager 120 stores the dependency data and the attached data 107. In one embodiment, the Manager 120 adds an arrival timestamp to the dependency data and the attached data 107. In one embodiment, the agent 112 adds a collection timestamp (e.g., time the dependency data and attached data 107 was collected) to the data prior to sending to Manager 120. Note that Manager 120 may receive dependency data and attached data 107 from many agents 112. This data from the different agents 112 may be combined.

In step 810, the Manager 120 determines whether flow data, including the dependency data and attached data 107, should be sent to the security manager 102. This flow data may be sent at any interval. The flow data may be sent upon request from the security manager 102 or without any specific request. In one embodiment, the Manger 120 analyzes the dependency data to determine whether there are any previously unobserved component pairs. If there is such a previously unobserved component pair, the Manager 120 may determine that the security monitor 102 should be informed of this.

In step 812, the Manager 120 determines what data should be used to send to the security monitor 102 as flow data. This may include pruning the dependency data such that the number of component pairs is reduced. In some embodiments, the Manager 120 selects "front end/back end" component pairs from the dependency data.

In step 814, the Manager 120 sends the flow data 108 (including the attached data 107) to the security manager 102. In the event that the Manager 120 detected a previously unobserved component pair, the Manager 120 might send a special event notification to highlight this.

As noted above, Agents 112 may collect dependency data and send it to Manager 120. Table 1 shows an example of dependency data that could be collected for vertices. As noted, vertices may correspond to software components. In this example, attached data 107 is included in the dependency data for vertices. The attached data 107 is not required to be included in the dependency data for vertices. In some embodiments, when the Manager 120 sends the flow data to the security manager 102 some of the following information is sent. In this example, each vertex has a set of "vertex properties."

TABLE 1

| Vertex Property | Description |
| --- | --- |
| Type | The type of software component. Examples include, but are not limited to, Starting Node, Front End, Back End, Servlet, EJB, etc. |
| Name | The name of the software component. Examples include, but are not limited to, class name, interface name, class-method name, database, URL, etc. |
| Update Time | The time at which the vertex was last updated. |
| Attached Data | Data associated with transaction |

Table 2 shows an example of the types of dependency data that could be collected for edges. As noted, edge data may pertain to dependencies between a pair of software components (or vertices) as transactions are processed. In this example, attached data 107 is included in the dependency data for edges. The attached data 107 is not required to be included in the dependency data for edges. In this example, each edge has a set of "edge properties."

TABLE 2

| Edge Property | Description |
| --- | --- |
| Head Vertex | The vertex (e.g., software component) at the end (head of arrow point to). |
| Tail Vertex | The vertex (e.g., software component) at the start (tail of arrow touches). |
| Owner | The name of the Application or Business Transaction that owns the edge. |
| Head Owner | Application that owns the head vertex/software component. |
| Tail Owner | Application that owns the tail vertex/software component. |
| Update Time | The time at which the edge was last encountered. |
| Attached Data | Data associated with transaction |

The following elaborates on example edge properties. Referring to FIG. 1B, the edge between component A1 and component A2 may be described as follows. The head vertex may be component A2. The tail vertex may be component A1. The edge owner may be managed application A 151A. The head vertex owner may be managed application A 151A. The tail vertex owner may be managed application A 151A.

As another example, the edge between component A3 and web service 109 may be described as follows. The head vertex may be the web service 109. The tail vertex may be component A3. The edge owner, head vertex owner, and tail vertex owner may all be managed application A 151A.

Note that the agent 112 could assign a special name for some components, such as "external vertex." For example, the web service 109 software component might be referred to as an "external vertex." The network 104 (or web browser 106) that sends a request to component A1 might also be called an "external vertex." One reason for this naming convention is that the actual software component that calls an application 151 might not be of interest to the security monitor 102. Therefore, a more general term such as "external vertex" may provide sufficient detail.

One embodiment herein includes a system comprising a processor that is programmed to access data attached to transactions as the transactions flow through a software application. The processor is programmed to compare the data attached to each of the transactions to pre-defined patterns to detect possible security violations.

One embodiment herein includes a method comprising determining a sequence of software components that process a transaction being processed by the software components that execute on an electronic device. The determining is performed by a circuit on the electronic device. Data that is attached to the transaction as the transaction flows through the sequence of software components is accessed. The accessing is performed by a circuit on the electronic device. The data that is attached to the transaction is compared with a pre-defined pattern to determine whether a security violation may have occurred.

One embodiment includes a computer program product comprising a computer readable storage medium having computer readable program code embodied therewith. The computer readable program code comprises computer readable program code configured to trace a transaction that is processed by a sequence of software components that execute on an electronic device. The computer readable program code being configured to access data that is associated with the transaction as the transaction flows through the sequence of software components. The computer readable program being configured to analyze the data associated with the transaction to detect a possible security violation.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   tracing a transaction that is processed by a sequence of software components that execute on an electronic device, the tracing is performed by a circuit on the electronic device, the tracing including collecting performance data for the transaction;
   accessing transaction data that is associated with the transaction as the transaction flows through the sequence of software components, the transaction data being included in the performance data, the accessing is performed by a circuit on the electronic device; and
   analyzing the data associated with the transaction to detect a possible data loss event that involves the transaction data.

2. The method of claim 1, further comprising adding a transaction identifier (ID) to the transaction as the transaction flows through the sequence of software components, wherein the accessing transaction data that is associated with the transaction comprises determining that different transaction data having the transaction ID from multiple points along the flow of the transaction are associated with the transaction.

3. The method of claim 2, further comprising:
   combining the transaction data from the multiple points along the flow, wherein the analyzing of the data to detect a possible data loss event that involves the transaction data comprises combining the transaction data from the multiple points along the flow and matching the combined transaction data with a pattern to detect a possible data loss event that involves the transaction data.

4. The method of claim 1, wherein the accessing transaction data that is associated with the transaction comprises:
   accessing data that is passed from one of the software components to another of the software components.

5. The method of claim 1, wherein the accessing transaction data that is associated with the transaction comprises:
   accessing data that is processed internally by one of the software components.

6. The method of claim 1, wherein the analyzing the accessed data to detect a possible data loss event that involves the transaction data comprises comparing the accessed data to a pre-defined pattern to detect a possible data loss event that involves the transaction data.

7. The method of claim 1, wherein the transaction is a particular type of transaction, the analyzing the accessed data to detect a possible data loss event that involves the transaction data comprises comparing the data to pre-defined data patterns for that type of transaction.

8. The method of claim 1, further comprising:
   halting the transaction in response to determining that there is a possible data loss event that involves the transaction data security violation.

9. The method of claim 1, wherein the accessing data that is associated with the transaction as the transaction flows through the sequence of software components is performed by monitoring software residing on the electronic device, the monitoring software monitors performance of the software components while processing the transaction, the performance data including a response time for performing the transaction.

10. A system comprising:
    a hardware processor programmed to:
    collect application mapping data for transactions as the transactions flow through a software application, the application mapping data describes dependencies between software components in the software application as the transactions flow;
    access transaction data attached to transactions as the transactions flow through the software application, the transaction data being included in the application mapping data; and
    compare the transaction data attached to each of the transactions to pre-defined patterns to detect possible data loss events that involve the transaction data.

11. The system of claim 10, wherein the processor is further programmed to add a transaction identifier (ID) to individual transactions as the transactions flow through the software application, the processor programmed to access transaction data that is attached to the transactions as the transactions flow comprises the processor programmed to:
    access transaction data at multiple points along the flow of a first of the transactions that has the same transaction ID.

12. The system of claim 11, wherein the processor is further programmed to:
    combine the transaction data from the multiple points along the flow of a first transaction of the transactions, wherein the processor compares the combined data with a pre-defined pattern to detect a possible data loss event that involves the first transaction.

13. The system of claim 10, wherein the software application comprises a plurality of software components, the processor programmed to access transaction data attached to the transactions as the transactions flow comprises the processor programmed to:
    access data that is passed from a first of the software components to a second of the software components.

14. The system of claim 10, wherein the software application comprises a plurality of software components, the processor programmed to access transaction data attached to the transactions as the transactions flow comprises the processor programmed to:
    access data that is processed internally by the plurality of software components.

15. The system of claim 10, wherein the transaction is a particular type of transaction, the processor programmed to compare the data to pre-defined patterns to detect possible data loss events that involve the transaction data comprises the processor programmed to compare the transaction data to pre-defined data patterns for that type of transaction.

16. The system of claim 10, wherein the processor is further programmed to:
    halt a first of the transactions in response to determining that there is a possible data loss event that involve the first transaction.

17. A method comprising:
    determining a sequence of software components that process a transaction being processed by the software components that execute on an application server, the transaction is performed in response to a request from a client device over a network to the application server, the determining including collecting dependency data for the transaction, the dependency data comprising vertices that each describe a software component used to execute the transaction and edges that each describe an ordered pair of the software component used to execute the transaction, the determining is performed by a circuit on the application server;

accessing transaction data that is attached to the transaction as the transaction flows through the sequence of software components, the transaction data being included in the dependency data, the accessing is performed by a circuit on the application server; and comparing the data that is attached to the transaction with a pre-defined pattern to determine whether the transaction data is subject to being lost in a security violation.

18. The method of claim 17, further comprising adding a transaction identifier (ID) to the transaction as the transaction flows through the sequence of software components, wherein the accessing transaction data that is attached to the transaction as the transaction flows comprises:

accessing data at multiple points along the flow of the transaction that have the same transaction ID.

19. The method of claim 18, further comprising:

combining the data from the multiple points along the flow that have the same transaction ID, wherein the comparing the transaction data to the pre-defined pattern compares the combined data with the pre-defined pattern to determine whether the transaction data is subject to being lost in a security violation.

20. The method of claim 17, wherein the accessing data that is attached to the transaction as the transaction flows comprises:

accessing data that is passed from or received by a first of the software components.

21. The method of claim 17, wherein the accessing transaction data that is attached to the transaction as the transaction flows comprises:

accessing data that is processed internally by a first of the software components.

22. The method of claim 17, wherein the transaction is a particular type of transaction, the comparing the transaction data with the pre-defined pattern comprises comparing the data to a pre-defined data pattern for that type of transaction.

23. The method of claim 17, further comprising:

halting the transaction in response to determining that a data loss event that involves the transaction data may have occurred.

24. A computer program product comprising:

a non-transitory computer readable storage medium having computer readable program code embodied therewith, the computer readable program code comprising:

computer readable program code configured to trace a transaction that is processed by a sequence of software components that execute on an electronic device;

computer readable program code configured to collect performance data for the transaction while tracing the transaction;

computer readable program code configured to access transaction data that is associated with the transaction as the transaction flows through the sequence of software components, the transaction data being included in the performance data; and computer readable program code configured to analyze the transaction data associated with the transaction to detect a possible data loss event that involves the transaction data.

* * * * *